United States Patent [19]
Rothe

[11] Patent Number: 5,788,316
[45] Date of Patent: Aug. 4, 1998

[54] FOLDING TOP FOR A CONVERTIBLE

[75] Inventor: Karl Rothe, Bramsche, Germany

[73] Assignee: Wilhelm Karmann GmbH, Osnabrueck, Germany

[21] Appl. No.: 685,227

[22] Filed: Jul. 23, 1996

[30] Foreign Application Priority Data

Aug. 24, 1995 [DE] Germany ............... 29513595 U

[51] Int. Cl.⁶ .................................................. B60J 7/00
[52] U.S. Cl. .............................. 296/107.07; 296/146.14
[58] Field of Search .................................. 296/107, 109, 296/114, 146.14

[56] References Cited

U.S. PATENT DOCUMENTS

| | | | |
|---|---|---|---|
| 3,536,354 | 10/1970 | Ingram | 296/146.14 X |
| 4,693,509 | 9/1987 | Moy et al. | 296/146.14 X |
| 4,778,215 | 10/1988 | Ramaciotti | 296/107 |
| 5,209,544 | 5/1993 | Benedetto et al. | 296/107 |
| 5,267,770 | 12/1993 | Orth et al. | 296/107 |

FOREIGN PATENT DOCUMENTS

| | | | |
|---|---|---|---|
| 3808909 | 4/1989 | Germany | 296/146.14 |
| 404011516 | 1/1992 | Japan | 296/146.14 |

*Primary Examiner*—Joseph D. Pape
*Attorney, Agent, or Firm*—Jordan and Hamburg

[57] ABSTRACT

A folding top for a convertible has a roofing which is taken up between rod linkage legs of a hinged rod linkage, which lie opposite one another on either side of the longitudinal axis of the vehicle, it being possible to fix the hinged rod linkage in the region of the windshield frame and the hinged rod linkage being supported in the rear region of the vehicle on the body over main supports lying opposite one another. A rear window is provided in the rear region of the roofing between a rear tensioning bracket and a corner hoop disposed transversely to the longitudinal axis of the vehicle, the outer wall regions of the rear window being connected in each case at the edges over holding parts with the hinged rod linkage. The rear window is guided by the holding parts on a path of motion, which has an arched region over the rear region of the vehicle with an arch height providing head space for passengers.

18 Claims, 5 Drawing Sheets

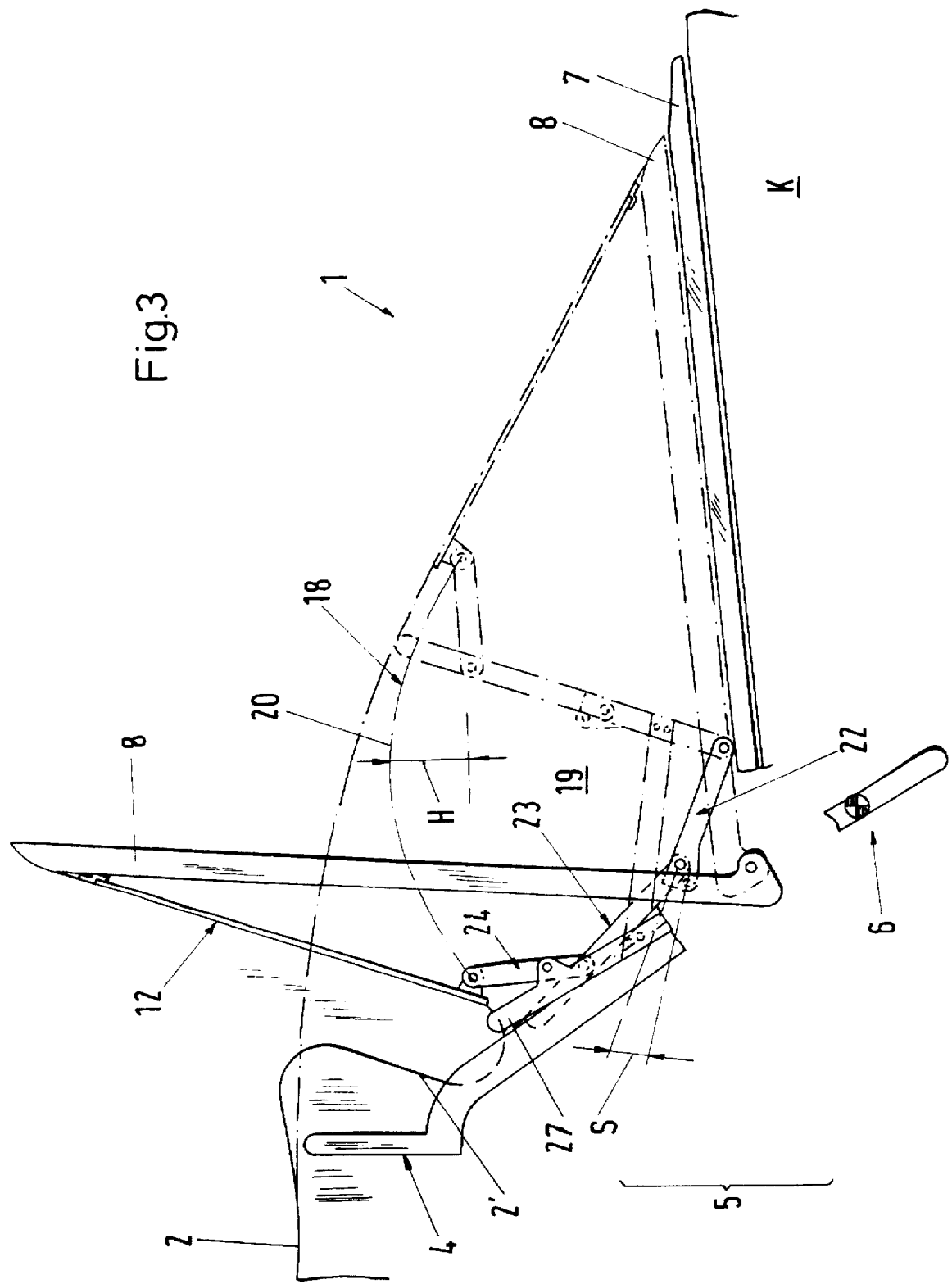

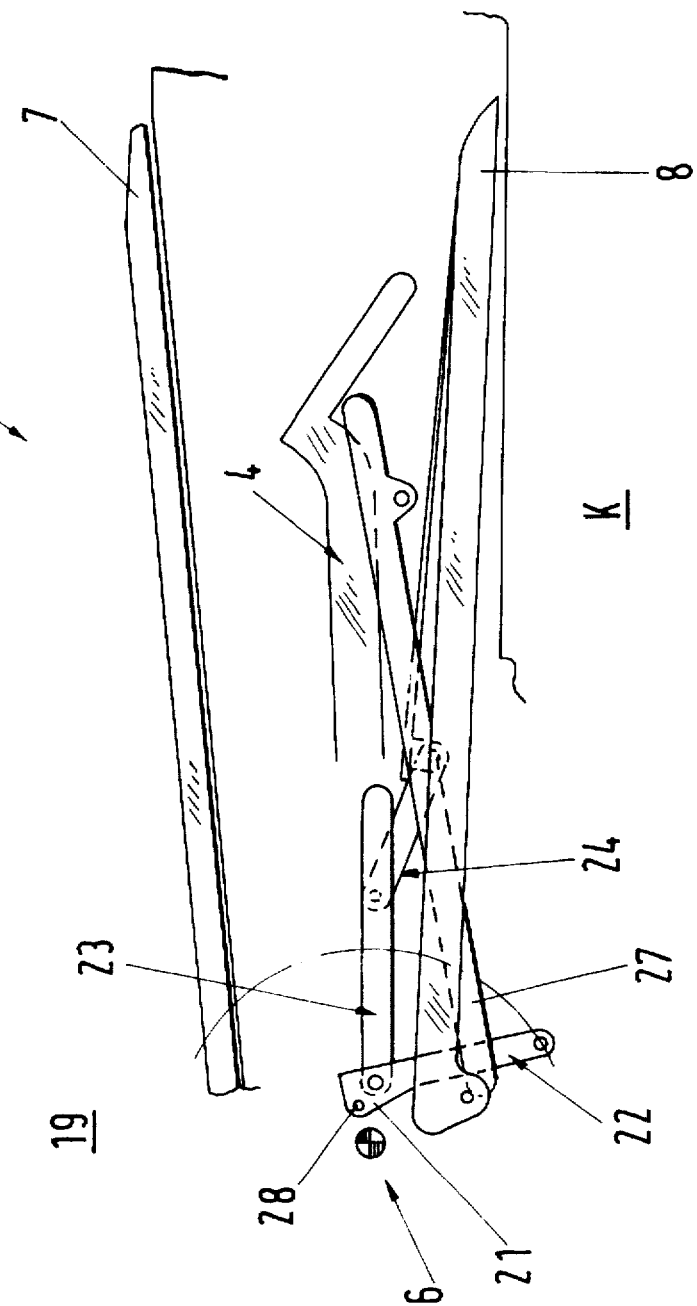

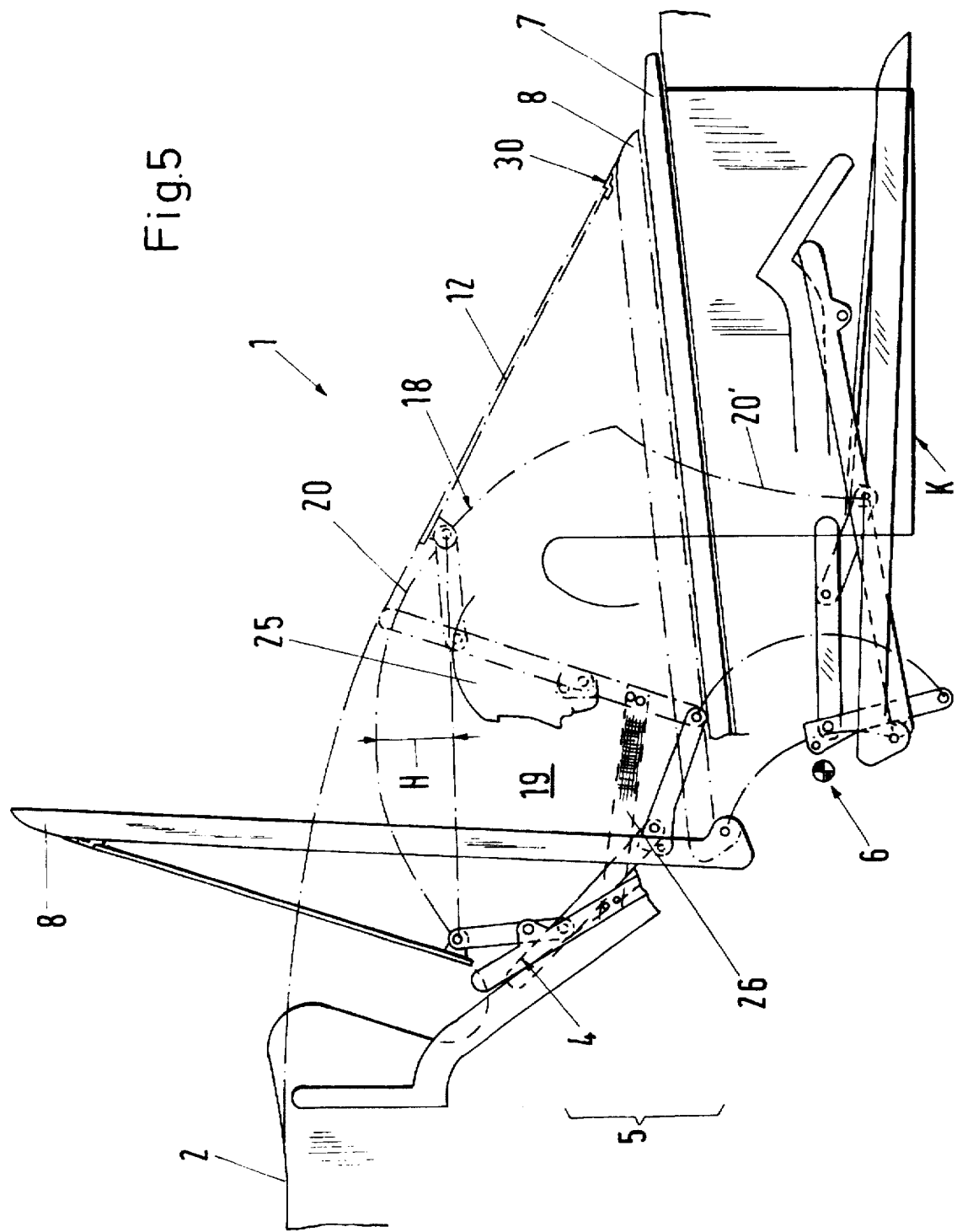

FOLDING TOP FOR A CONVERTIBLE

BACKGROUND OF THE INVENTION

The invention relates to a folding top for a convertible.

For known convertibles, the folding top, when in the closed position, has in the rear, tensioned region of its roofing a rear window, which is integrated with edge frame parts largely into the roofing. Additional holding parts, in the form of positioning belts engage the edges of the frame parts. When the folding top is moved into or out of the top-storage well, these additional holding parts are moved together with a hinged rod linkage in such a manner, that a controlled deposition of the rear window is achieved. For this movement of the folding top, which is typical for a convertible, the rear region of the vehicle is constricted at least in the swiveling phase in the region of the rear bench seat by the rear window swiveling over it and the rear window, as a whole, is subjected to high stresses during the holding and swiveling motions.

SUMMARY OF THE INVENTION

It is an object of the invention to provide a folding top for a convertible, the rear window of which, connected with the rear region of the roofing, is provided with structurally simple holding parts which, without affecting the head space in the rear region of the vehicle, make possible an ample control of the rear window movement, while, at the same time, imposing little stress on the roofing.

The invention provides a folding top for a convertible, the rear window of which, integrated in the rear roof region particularly when constructed as a glass pane, has with the link structure, engaging the edge, a supporting and controlling unit, over the hinged elements of which, which can be forcibly moved essentially parallel to the longitudinal axis of the vehicle, an overhead control of the folding roof, when the latter is swiveled into the open or closed position, is possible in such a way that a passenger in the rear of the vehicle is not affected.

In the region of its free end, the swivel joint structure which preferably has four joint connection points, engages in the rear region of its free end the frame of the rear window over a reversing lever as joint element in such a manner, that a front transverse edge of the rear window, pointing in the swiveling direction always towards the rear region of the vehicle, describes an orbital curve, which follows the upper part of the corner hoop in each swiveling phase and has an arc height, which is effective as head space particularly over the rear region.

The rear roofing region with the rear window pane can be moved without tension in any swiveling phase over the upper corner hoop part, which is constructed in two parts in the swivel joint structure and a lower joint element, so that local overloading is avoided and the folding top can be swiveled in and out gently in the region of the rear top-storage well.

In an advantageous embodiment, the dimensions of the joint elements are optimized so that an additional guiding component, directed forward in the longitudinal direction of the vehicle, is superimposed on the path of motion of the rear window while swiveling into and out of the top-storage well. Accordingly, a space-saving positioning of the folding top in the depositing position can be achieved with little effort and an unimpeded movement of the folding top is possible also when space relationships are tight.

With regard to further advantages and details of the invention, reference is made to the following specification and the drawing, in which an embodiment of the object of the invention is shown diagrammatically in greater detail.

BRIEF DESCRIPTION OF THE DRAWINGS

FIG. 3 shows a side view similar to that of FIG. 2, with the folding top in an opening phase, FIG. 4 shows a side view of the folding top deposited in its top-storage well, and FIG. 5 shows a side view of the folding top with several phases of motion in one representation.

DESCRIPTION OF THE PREFERRED EMBODIMENTS

Figure 1:
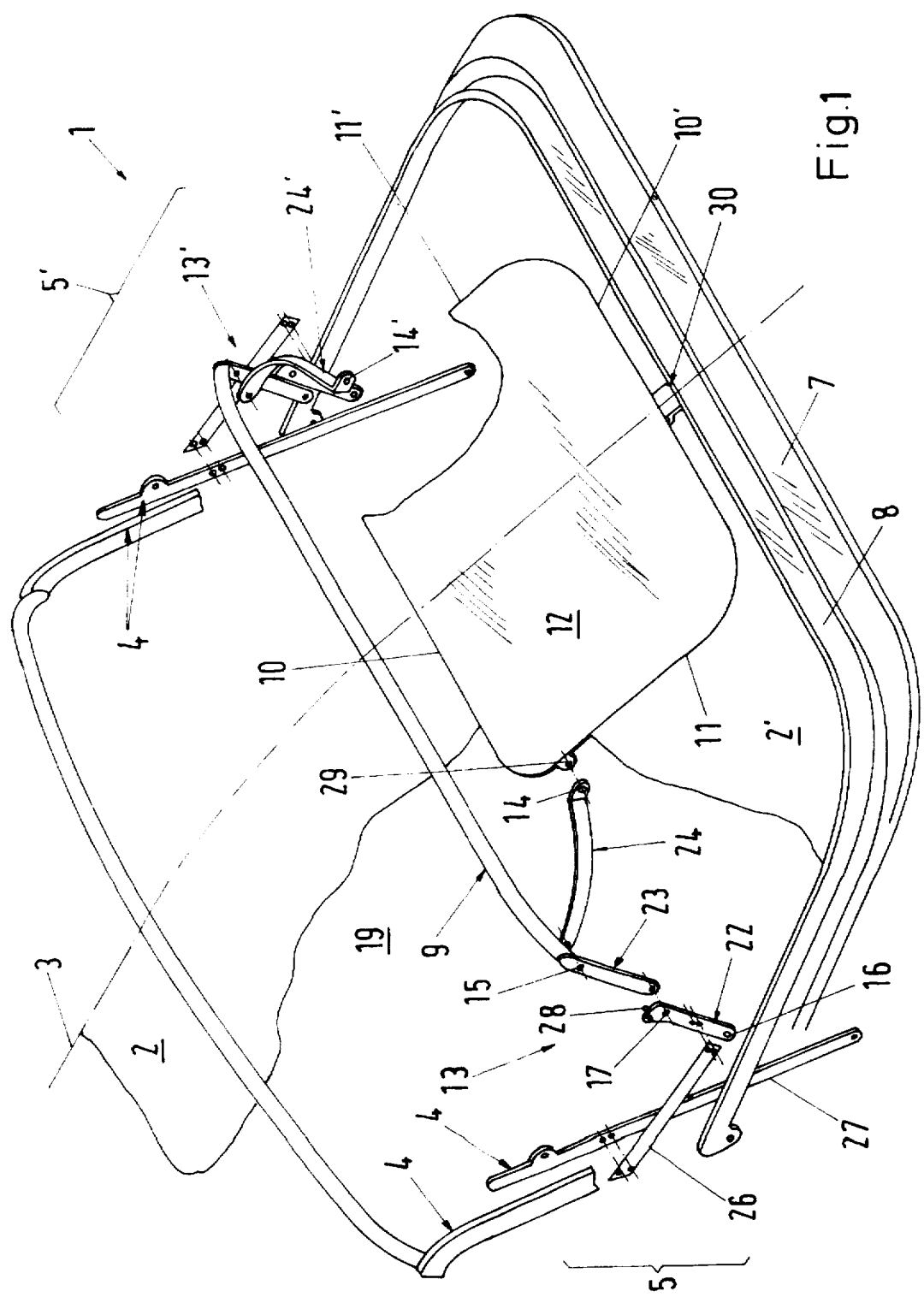
FIG. 1 shows a partially sectional perspective representation of a folding top in the region of its rear roofing region.

FIG. 1 shows a perspective rear view of a folding top, which is labeled 1 as a whole and is intended for a convertible, the details of which are not shown. Roofing 2 extends between rod linkage legs 4 of a hinged rod linkage 5, which can be fixed in the closed position in the region of the windshield frame (not shown). The rod linkage legs 4 lie opposite one another symmetrically on either side of the longitudinal axis 3 of the vehicle.

In the rear region of the vehicle, the hinged rod linkage 5 is supported on the body side in the region of a main drag bearing 6 (FIG. 2) and the rear-side roofing region 2' extends between a rear tensioning bracket 8 lying in the closed position on a top-storage well lid 7 and a corner hoop 9, disposed transversely to the longitudinal axis 3 of the vehicle. A rear window 12, provided with frame parts, the details of which are not shown, is integrated at its outer edge regions 10, 11 or 10', 11' in the rear-side roofing region 2'.

The folding top 1, constructed pursuant to the invention, is provided in the lateral rear region of the hinged rod linkage 5 with swivel joint structure 13, 13' forming respective holding parts for the rear window 12, the joint elements of the swivel joint structure 13, 13' being supported in each case over a hinge connection 14, 15, 16 at the outer wall region 11, 11' of the rear window 12, at the corner hoop 9 and towards the main drag bearing 6.

The exploded representation of the individual parts of the hinged rod linkage 5 in FIG. 1 illustrates that the swivel joint structure 13 is constructed in two parts in the region of the part of the corner hoop 9, directed in each case to the main drag bearing 6, and has a further hinge connection 17. Accordingly, the swivel joint structure 13, at the one end forms the lower joint element 22, which initiates the controlled movement in the region of the main drag bearing 6 and, at the other, is connected with an upper part 23 of the corner hoop. At this upper part 23, a reversing lever 24 is provided, which sticks out essentially parallel to the longitudinal axis 3 of the vehicle, is connected with the rear window 12 in the region of the longitudinal edge 11 and, in the closed position, forms the upper joint element of the swivel joint structure 13 (FIG. 2).

Figure 2:
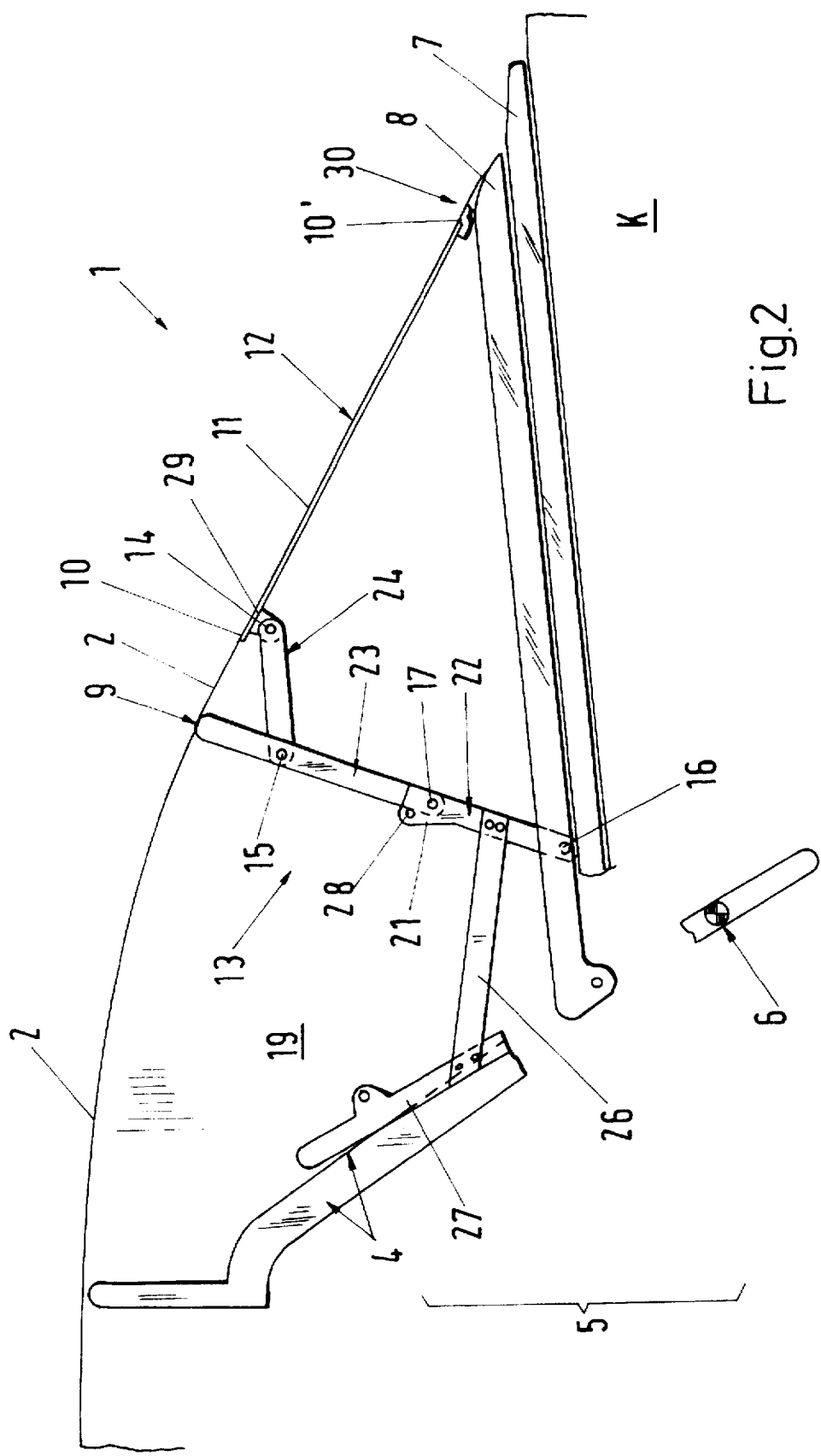
FIG. 2 shows a side view of the folding top of FIG. 1.

When viewed together with FIGS. 3 or 5, the representation of the folding top 1 of FIG. 2 illustrates the different movement phases of the folding top 1 and its components in the region of the hinged rod linkage 5, the rear window 12 being guided over the joint elements 14, 15, 16 and 17 over a path 18 of motion, which forms at least over the rear region 19 of the vehicle an arched region 20 with an arched height H, which provides headroom for a passenger 25 (FIG. 5). In the region of the top-storage well K, the path 18 of motion has an arched region 20', with which the swiveling in or out of the folding top 1 or the rear window 12 in the region of the top-storage well becomes clear.

In an appropriate construction, the lower link element 22 is provided with a tension belt 26, which extends in the direction of the longitudinal axis 3 of the vehicle and is connected with a guide rod 27 of the hinged rod linkage 5. The tension belt 26 takes hold of the link element 22 essentially centrally, so that a tension-stable connection is formed between the guide rod 27 and the link element 22 of the swivel joint structure link chain 13 and is stiffened in the closed position (FIG. 2).

The lower link element 22 is furthermore provided in the region of the hinge connection 17, formed in the direction of the upper part 23 of the corner hoop, with a shape expansion 21, at which a stop 28 is provided, which limits the swiveling path S (FIG. 3) of the upper part 23 of the corner hoop in the driving direction in this joint connecting region (locating position shown in FIG. 2).

The perspective rear view of the folding top 1 of FIG. 1 illustrates that the reversing lever 24, starting out from the hinge connection 15 at the upper part 23 of the corner hoop, has a contour, which is bent towards the longitudinal center plane 3 of the vehicle and adapted essentially to the roof contour of the folding top 1 in the closed position. In the region of the hinge connection 14, the reversing lever 24 is supported over a pivoting bracket 29 at the longitudinal frame part 11 of the rear window 12. Likewise, it is conceivable to construct the reversing lever 24 multi-sectionally (not shown) so that the swivel joint structure 13, which is provided with three link elements 22, 23, 24 in the embodiment shown, has four link elements, for example.

The representation of FIG. 2 moreover illustrates that the rear window 12 is provided in the region of its rear transverse frame part 10' with a hinge part 30, which is directed towards the tensioning bracket 8 of the folding top 1. In an appropriate version, this hinge part 30 can be constructed as a double-jointed hinge.

With this hinge part 30, together with the two hinge connections 14, 14' and the reversing levers 24, 24', a three-point support for the rear window 12 is formed, so that the stiffness of the folding top 1 in the rear region 2' of the roofing is improved overall and a rotation-resisting connection of the rear window 12 with the tensioning bracket 8 is achieved.

What is claimed is:

1. In a folding roof for a convertible in which the convertible has a vehicle body having a rear portion and wherein the folding roof includes a roof-supporting rod linkage having an up position and a down position in which the folding roof is stored in a storage well in said vehicle body, the rod linkage being pivotably supported on said rear portion of said vehicle body, a rear window provided at a rear portion of the folding roof, a corner hoop supporting said roof in its up position, a tensioning bracket at the rear of the folding roof, said rear window being disposed between said corner hoop and said tensioning bracket, and a swivel joint structure operably connected between said rear window and said rod linkage providing for movement of said window along a movement path between an operable position in which the window overlies said storage well and which occurs when said rod linkage is in its up position and a temporary position in which said window is displaced from said operable position, said movement path including an arched region located over the rear portion of the vehicle body which provides head space for vehicle passengers.

2. In a folding roof for a convertible according to claim 1 in which said arched region has a generally C-shaped configuration with the opening of the generally C-shaped configuration facing downwardly.

3. In a folding roof for a convertible according to claim 1 wherein said swivel joint structure comprises upper and lower link elements, and fourth pivot means pivotably connecting said upper and lower link elements, said upper link element being pivotably connected to said corner hoop by said second pivot means, said third pivot means being pivotably connected to said lower link element.

4. In a folding roof for a convertible according to claim 3 wherein said vehicle body has a longitudinal axis, said rod linkage including a guide rod, and a tension belt connected between said guide rod and said lower link element, said tensioning belt extending generally parallel to the longitudinal axis of the vehicle body when said window is in said operable position.

5. In a folding roof for a convertible according to claim 3 further comprising stop means on said upper and lower link elements, said stop means having an engaged and a disengaged position, said stop means being in said engaged position when said window is in said operational position, said stop means being in said disengaged position when said window is in said displaced position.

6. In a folding roof for a convertible according to claim 5 wherein said stop means stops the relative pivotal movement between said upper and lower link elements when said window reaches said operable position.

7. In a folding roof for a convertible according to claim 3 wherein said swivel joint structure comprises a reversing lever pivotably mounted on said window by said first pivot means and pivotably mounted on said corner hoop by said second pivot means.

8. In a folding roof for a convertible according to claim 7 wherein said reversing lever extends generally parallel to the longitudinal axis of the vehicle body when the window is in said operable position and when the reversing lever is viewed in elevation from one side of the vehicle body.

9. In a folding roof for a convertible according to claim 7 wherein said reversing lever has a generally arcuate configuration when viewed in plan view from the top of the vehicle and said window is in said operable position, said vehicle body having a longitudinally extending centerline, said tensioning bracket curving generally rearwardly and towards said centerline as said reversing bracket extends from said second pivot means to said first pivot means.

10. In a folding roof for a convertible according to claim 7 wherein said window has an edge, said first pivot means pivotably mounting said reversing lever on said edge of said window.

11. In a folding roof for a convertible according to claim 7 further comprising a bracket on said edge of said window, said first pivot means pivotably supporting said reversing lever on said bracket.

12. In a folding roof for a convertible according to claim 1 wherein said window has a transverse rear section juxtaposed to said tensioning bracket, and hinge means pivotably connecting said transverse rear section of said window with said tensioning bracket.

13. In a folding roof for a convertible according to claim 12 wherein said hinge means is a double jointed hinge means.

14. In a folding roof for a convertible according to claim 1 wherein said storage well has a storage well cover having a closed position which overlies said storage well, said window generally overlying said storage well cover when said window is in said operable position, said window being substantially displaced from overlying said storage well cover when said window is in said displaced position.

15. In a folding roof for a convertible according to claim 14 further comprising connecting means connecting said window to said tensioning bracket, said tensioning bracket being pivotal between an operable position corresponding to the operable position of said window and a displaced position corresponding to the displaced position of said window, said window pivoting at said connecting means relative to said tensioning bracket as said window and said tensioning bracket are moved between their respective operable and displaced positions.

16. In a folding roof for a convertible according to claim 14 wherein said swivel joint structure is operable to move said window to a storage position in which the window is stored in said storage well when said storage well cover is in said closed position, said window underlying said storage well cover when said storage well cover is in said closed position and said window is in said storage position.

17. In a folding roof for a convertible according to claim 14 wherein said swivel joint structure is moveable to a storage position in which the swivel joint structure is stored in said storage well when said storage well cover is in said closed position, said swivel joint structure underlying said storage well cover when said storage well cover is in said closed position and said window is in said storage position.

18. A folding roof for a convertible in which the convertible has a vehicle body having a storage well along with a rear portion, comprising a folding roof, a roof-supporting rod linkage having an up position and a down position in which the folding roof is stored in said storage well, pivot support means pivotably supporting said rod linkage on said rear portion of said vehicle body, a rear window provided at a rear portion of the folding roof, a corner hoop supporting said roof in its up position, a tensioning bracket at the rear of the folding roof, said rear window being disposed between said corner hoop and said tensioning bracket, and a swivel joint structure connecting said rear window and said rod linkage providing for movement of said window along a movement path between an operable position in which the window overlies said storage well and which occurs when said rod linkage is in its up position and a temporary position in which said window is displaced from said first position, said movement path including an arched region having a generally C-shaped configuration with the opening of the C-shaped configuration facing downwardly, said arched region being located over the rear portion of the vehicle body to thereby provide head space for vehicle passengers in said vehicle when said window is moved along said movement path.

* * * * *